United States Patent
Chen et al.

(10) Patent No.: US 12,463,702 B2
(45) Date of Patent: Nov. 4, 2025

(54) SYNCHRONIZATION SIGNAL BLOCK MEASUREMENTS WITH CLEAR CHANNEL ASSESSMENT FOR 60GHZ RANGE

(71) Applicant: Apple Inc., Cupertino, CA (US)

(72) Inventors: Xiang Chen, Campbell, CA (US); Jie Cui, San Jose, CA (US); Dawei Zhang, Saratoga, CA (US); Hong He, Cupertino, CA (US); Huaning Niu, Cupertino, CA (US); Manasa Raghavan, Sunnyvale, CA (US); Oghenekome Oteri, San Diego, CA (US); Qiming Li, Beijing (CN); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/920,444

(22) PCT Filed: Dec. 23, 2021

(86) PCT No.: PCT/CN2021/140799
§ 371 (c)(1),
(2) Date: Oct. 21, 2022

(87) PCT Pub. No.: WO2023/115453
PCT Pub. Date: Jun. 29, 2023

(65) Prior Publication Data
US 2024/0297705 A1    Sep. 5, 2024

(51) Int. Cl.
*H04B 7/06* (2006.01)
*H04B 17/318* (2015.01)
(Continued)

(52) U.S. Cl.
CPC ....... *H04B 7/06952* (2023.05); *H04B 17/328* (2023.05); *H04W 24/08* (2013.01);
(Continued)

(58) Field of Classification Search
CPC . H04B 7/06952; H04B 17/328; H04W 76/28; H04W 24/08; H04W 24/10; H04W 56/0015; H04W 74/0816
(Continued)

(56) References Cited

U.S. PATENT DOCUMENTS 11,564,183 B2 *  1/2023  Hakola ............. H04W 72/0446
2019/0306726 A1 * 10/2019  Mo ..................... H04B 7/0404
(Continued)

FOREIGN PATENT DOCUMENTS

| CN | 111294825 |   | 6/2020 |   |
|---|---|---|---|---|
| CN | 111294825 A | * | 6/2020 | ............ H04W 24/02 |
| WO | WO-2023009821 A1 | * | 2/2023 | ............ H04W 24/10 |

OTHER PUBLICATIONS

International Search Report and Written Opinion for PCT/CN2021/140799; 5 pages; Sep. 29, 2022.
(Continued)

*Primary Examiner* — Mong-Thuy T Tran
(74) *Attorney, Agent, or Firm* — Kowert, Hood, Munyon, Rankin & Goetzel, P.C.

(57) ABSTRACT

Methods, apparatuses, and systems are disclosed for compensating for cell identification delays that are beyond the control of the UE, in connection with standards-specified cell identification timing limits. In frequency bands including both beam sweeping and listen-before-talk (LBT) requirements, a cell identification procedure may be significantly delayed due to LBT failure at the base station and/or beam misalignment between the base station and the UE. Therefore, UE cell identification timing constraints may be dynamically adjusted to compensate for such delays. For example, the time window allowed for cell identification of a neighbor cell may be dynamically increased in response to determining that one or more SSBs were not available at the UE during an SMTC occasion. In some scenarios, if the
(Continued)

timing increase exceeds a predetermined threshold, the UE may restart the cell identification procedure, e.g., on the same frequency layer or on a different frequency layer.

17 Claims, 4 Drawing Sheets

(51) Int. Cl.
    *H04W 24/08*    (2009.01)
    *H04W 24/10*    (2009.01)
    *H04W 56/00*    (2009.01)
    *H04W 74/0816*  (2024.01)
    *H04W 76/28*    (2018.01)

(52) U.S. Cl.
    CPC ....... *H04W 24/10* (2013.01); *H04W 56/0015* (2013.01); *H04W 74/0816* (2013.01); *H04W 76/28* (2018.02)

(58) Field of Classification Search
    USPC .......................................................... 370/329
    See application file for complete search history.

(56) References Cited

U.S. PATENT DOCUMENTS

| | | | |
|---|---|---|---|
| 2019/0306850 A1* | 10/2019 | Zhang | H04B 7/0465 |
| 2019/0319748 A1* | 10/2019 | Nam | H04W 72/563 |
| 2020/0396627 A1 | 12/2020 | Hwang | |
| 2020/0413276 A1 | 12/2020 | Zhu | |
| 2021/0159966 A1* | 5/2021 | Xi | H04L 5/0023 |
| 2021/0258805 A1* | 8/2021 | Kazmi | H04B 7/0695 |
| 2021/0376907 A1* | 12/2021 | Zhu | H04B 7/0626 |
| 2022/0038927 A1* | 2/2022 | Manolakos | G01S 5/0221 |
| 2022/0190902 A1* | 6/2022 | Zhang | H04W 52/367 |
| 2023/0043953 A1* | 2/2023 | Dallal | H04W 74/0833 |
| 2023/0284038 A1* | 9/2023 | Dimou | H04W 16/28 370/329 |
| 2024/0089935 A1* | 3/2024 | Baldemair | H04L 5/0053 |

OTHER PUBLICATIONS

Ericsson "Measurement procedure requirements for HST FR2"; 3GPP TSG RAN WG4 #100-e R4-2113327; 3 pages; Aug. 16, 2021.

* cited by examiner

SYNCHRONIZATION SIGNAL BLOCK MEASUREMENTS WITH CLEAR CHANNEL ASSESSMENT FOR 60GHZ RANGE

PRIORITY CLAIM

This application is a national phase entry of PCT application number PCT/CN2021/140799, entitled "NR SSB Measurements with CCA for 60 GHz Range," filed Dec. 23, 2021, which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for configuring measurement timings in cellular communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, as diverse UE capabilities and new frequency ranges are integrated with more traditional UE devices, UEs and networks may require new procedures for managing measurement and signaling resources in the network. Accordingly, improvements in the field are desired.

SUMMARY

Embodiments are presented herein of apparatuses, systems, and methods for accommodating cell identification delays that are beyond the control of the UE.

For example, a method is disclosed, which may be performed by a user equipment (UE). The UE may monitor a receive channel on a first frequency layer, using a beam sweeping procedure, to attempt to receive from a neighbor base station up to a predetermined number (S) of synchronization signals at scheduled measurement occasions within an allowed time window. The beam sweeping procedure may include performing a plurality of rounds of beam sweeping, wherein a round of beam sweeping includes monitoring the receive channel at N consecutive scheduled measurement occasions, according to N different beam directions. An initial value of the allowed time window may include N*S scheduled measurement occasions. For each round of beam sweeping performed within the allowed time window, the UE may determine whether a synchronization signal was received at any of the scheduled measurement occasions of the respective round of beam sweeping. In response to determining that no synchronization signal was received at any of the scheduled measurement occasions of the respective round of beam sweeping, the UE may increase the allowed time window by a time sufficient to include a predetermined number of additional scheduled measurement occasions.

In some scenarios, the UE may transmit to a serving base station a synchronization signal measurement report within the predetermined time window upon successfully receiving S synchronization signals. In some such scenarios, the synchronization signal measurement report may include a cell identification of the neighbor cell and a reference signal receive power (RSRP), a reference signal received quality (RSRQ), or a signal-to-noise and interference ratio (SINR) of the received synchronization signals. In some such scenarios, the UE may decode a first subset of the S synchronization signals to obtain the cell identification of the neighbor cell and measure a second subset of the S synchronization signals to obtain the at least one of the RSRP, RSRQ, or SINR.

In some scenarios, the UE may determine that the allowed time window has increased beyond a predetermined threshold. In response to determining that the allowed time window has increased beyond the predetermined threshold, the UE may restart the allowed time window. In some such scenarios, the UE may also, in response to determining that the allowed time window has increased beyond the predetermined threshold, transition to monitoring a second, different frequency layer. In some such scenarios, the predetermined threshold may be determined based on a discontinuous reception (DRX) cycle length used by the UE.

In some scenarios, the receive channel may be included in a frequency band requiring use of a listen-before-talk (LBT) procedure.

In some scenarios, the predetermined number of additional scheduled measurement occasions may be N additional scheduled measurement occasions.

Apparatuses, systems, and memory media are disclosed for performing any of the methods described above.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
GSM: Global System for Mobile Communication
UMTS: Universal Mobile Telecommunication System
EUTRA: Evolved UMTS Terrestrial Radio Access
LTE: Long Term Evolution
NR: New Radio
TX: Transmission/Transmit
RX: Reception/Receive
RAT: Radio Access Technology
MAC: Medium Access Control
GNSS: Global Navigation Satellite System
RSRP: Reference Signal Received Power
RSRQ: Reference Signal Received Quality
BWP: Bandwidth Part
MGRP: Measurement Gap Repetition Period
SSB: Synchronization Signal Block
SMTC: SSB Measurement Timing Configuration
CSSF: Carrier-Specific Scaling Factor
LBT: Listen-Before-Talk
CCA: Clear Channel Assessment

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops. PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 1:
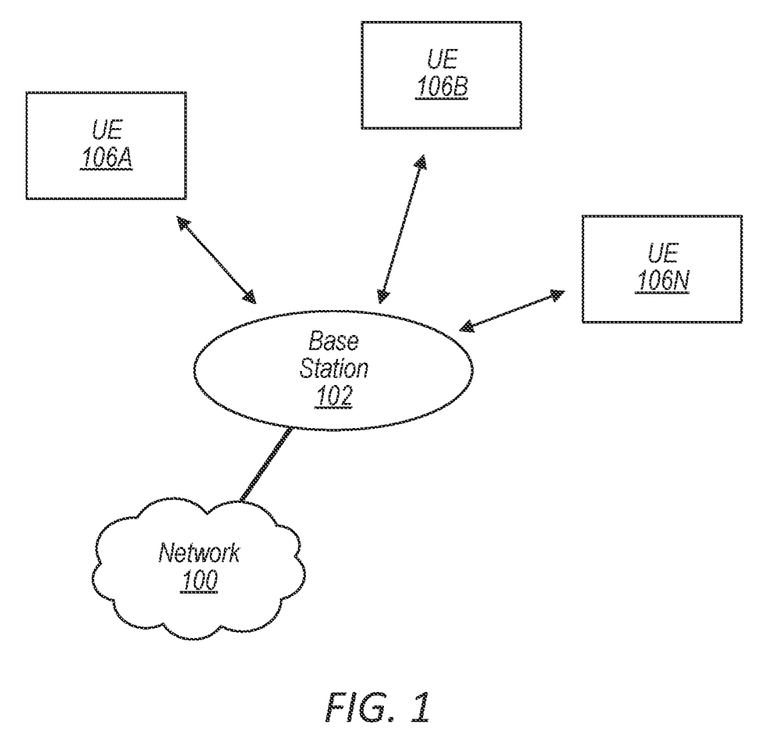
FIG. 1 illustrates an exemplary (and simplified) wireless communication system, according to some embodiments.
Figure 2:
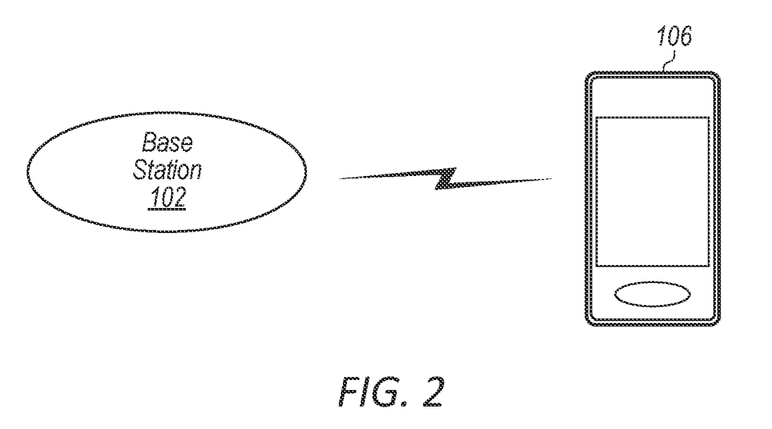
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an "eNodeB" or "eNB". If the base station 102 is implemented in the context of 5G NR, it may alternately be referred to as a "gNodeB" or "gNB". The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to compensate for cell identification delays, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
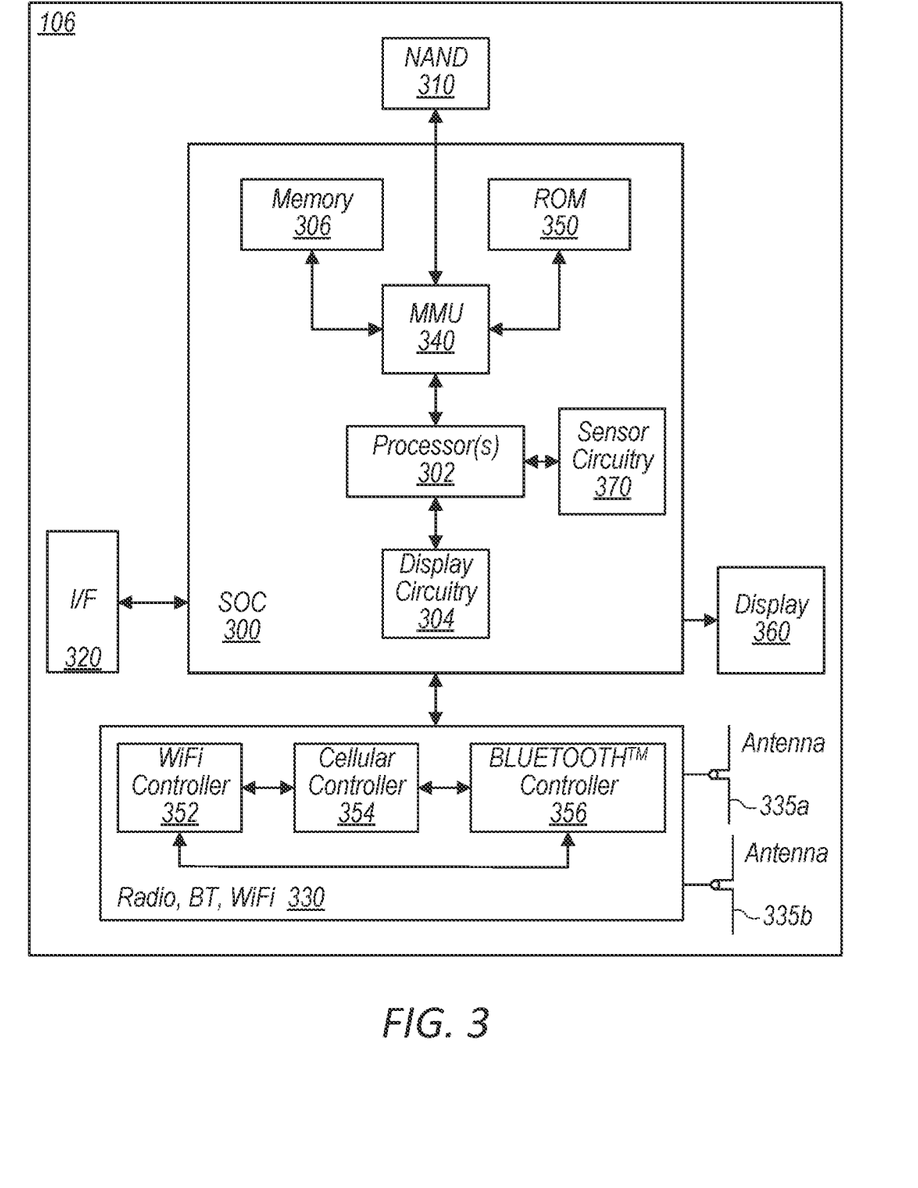
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. In some implementations, the display 360 may include a touchscreen capable of detecting user input. e.g., as touch events. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector interface (I/F) 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE. LTE-A, NR, CDMA2000, BLUETOOTH™, Wi-Fi, GPS, etc.). The UE device 106 may include at least one antenna (e.g., 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to compensate for cell identification delays, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to compensate for cell identification delays according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE. LTE-A, and/or NR controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
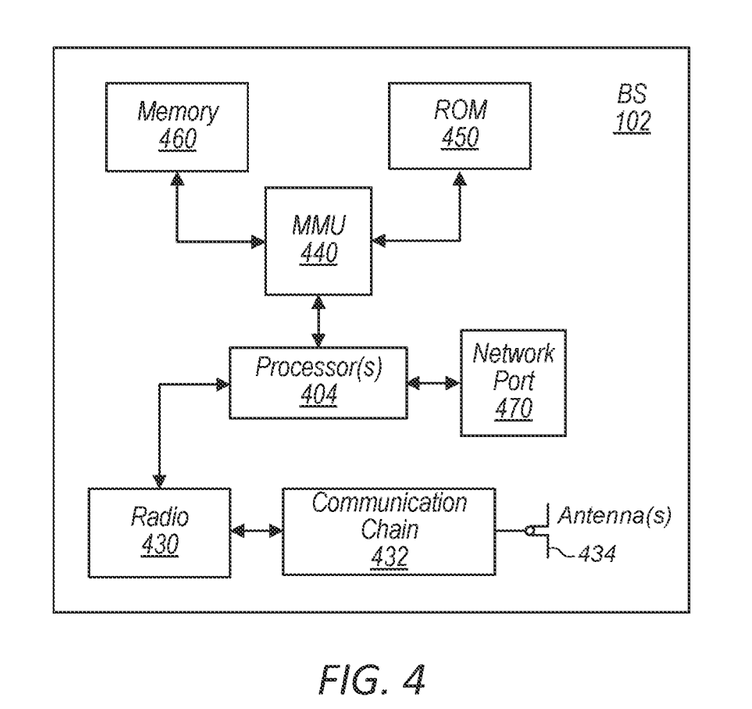
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE device 106 via radio 430. The antenna(s) 434 communicates with the radio 430 via communication chain 432. Communication chain 432 may be a receive chain, a transmit chain or both.

The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Adjusting Cell Identification Time Allowances

As cellular communications become more ubiquitous, existing frequency resources have become more congested, leading to efforts to expand cellular communications into new frequency ranges. For example, 3GPP is currently evaluating use of a new frequency band in the range of 52.6 GHZ-71 GHz, which has been designated as FR2-2.

Because higher frequencies may result in increased path loss, communications in this band, as well as other high-frequency bands, may use beamforming techniques implemented by base stations and/or UEs. For example, when a base station, such as the base station 102, transmits a signal to a UE, such as the UE 106, the base station may utilize TX beamforming to direct the signal toward the UE, and the UE may utilize RX beamforming when seeking to receive the signal. If the UE is not currently connected to the base station, the UE may not have information regarding the correct beam to use when receiving the signal. The UE may therefore perform beam sweeping procedures to improve reception of the signal.

One example of such a beam sweeping procedure may be applied in connection with reception of synchronization signal blocks (SSBs) for cell identification and measurement of neighbor cells. A UE may periodically receive SSBs from a base station of a neighbor cell, e.g., to support cell handover, addition of a new component carrier, etc. The UE may decode a primary synchronization signal (PSS) and/or a secondary synchronization signal (SSS) included in an SSB to identify the transmitting cell. The UE may also measure characteristics of the SSB, such as measuring the reference signal received power (RSRP), reference signal received quality (RSRQ), and/or signal-to-noise and interference ratio (SINR or SS-SINR) and may report such measurements to the network via a serving cell.

The base station may transmit such SSBs, with beamforming directed toward the UE, during periodic SSB measurement timing configuration (SMTC) occasions scheduled for the UE. The network may communicate the SMTC occasion timing to the UE, e.g., via RRC signaling. During the SMTC occasions, the UE may attempt to receive the SSB from the base station. For inter-frequency measurements (e.g., if the neighbor base station transmits the SSB on a different frequency band than the UE is using for any presently serving cell), the UE may tune away from the serving cell to receive the SSB. e.g., during a scheduled measurement gap coinciding with the SMTC occasion. Between SMTC occasions, the UE may perform other tasks, such as transmit and/or receive communications with the current serving cell(s).

Because the UE is not presently connected to the neighbor cell, the UE may not have accurate/current beamforming information for receiving the SSBs, especially if the neighbor cell has not previously been detected. However, the UE may be able to successfully decode and/or measure the SSB only if the correct beamforming configuration is used. Therefore, to successfully receive an SSB, the UE may sweep through a series of directional RX beams. The number of RX beams used may be referred to as a beam sweeping factor (N). For example, for frequency band FR2-1, 3GPP has currently defined N=8. The UE may receive on one RX beam during each SMTC occasion, and may sweep through the N RX beams during N consecutive SMTC occasions. The UE may therefore hope to successfully receive an SSB on one SMTC occasion out of each N occasions. To successfully decode the SSB, the UE may need to successfully receive up to three copies of the SSB. Thus, successfully decoding the SSBs for cell identification may be expected to involve up to approximately 3*N (e.g., 24) SMTC occasions. Measuring the average power of the received SSBs may similarly require 3 successful samples, and may, in some implementations, begin after the cell identification procedure is successful. Thus, performing both cell identification and power measurement may be expected to involve up to approximately 6*N (e.g., 48) SMTC occasions.

To ensure that cellular networks can operate at a desired level of speed and efficiency, an applicable standards body may dictate a maximum cell identification time, within which any UE operating on the network is to be capable of performing such neighbor cell identification. For example, current 3GPP standards, as defined by 3GPP TS 38.133 V.17.3.0 (referred to hereinafter as "TS 38.133")(hereby fully incorporated by reference herein), define such procedures for use in FR1 and FR2-1. For example, TS 38.133 section 9.2.5.1 dictates that, for intra-frequency measurements, "[t]he UE shall be able to identify a new detectable intra-frequency cell within $T_{identify\_intra\_without\_index}$" in certain circumstances. The value of $T_{identify\_intra\_without\_index}$ is presently defined as: $T_{identify\_intra\_without\_index} = (T_{PSS/SSS\_sync\_intra} + T_{SSB\_measurement\_period\_intra})$ ms. Similar values are defined for other circumstances, such as measurements using an SSB index, measurements using measurement gaps, and inter-frequency measurements.

The value $T_{PSS/SSS\_sync\_intra}$ is the time period allowed for detection and decoding of PSS/SSS, and, as one example, is defined for some circumstances in the following table:

TABLE 1

| DRX cycle | $T_{PSS/SSS\_sync\_intra}$ |
|---|---|
| No DRX | max(600 ms, ceil($M_{pss/sss\_sync\_w/o\_gaps} \times K_p \times K_{layer1\_measurement}$) × SMTC period)[Note 1] × $CSSF_{intra}$ |
| DRX cycles ≤ 320 ms | max(600 ms, ceil(1.5 × $M_{pss/sss\_sync\_w/o\_gaps} \times K_p \times K_{layer1\_measurement}$) × max(SMTC period, DRX cycle)) × $CSSF_{intra}$ |
| DRX cycle > 320 ms | ceil($M_{pss/sss\_sync\_w/o\_gaps} \times K_p \times K_{layer1\_measurement}$) × DRX cycle × $CSSF_{intra}$ |

NOTE 1:
If different SMTC periodicities are configured for different cells, the SMTC period in the requirement is the one used by the cell being identified The value $T_{SSB\_measurement\_period\_intra}$ is the time period allowed for measurement of the SSB, and, as one example, is defined for some circumstances in the following table:

TABLE 2

| DRX cycle | $T_{SSB\_measurement\_period\_intra}$ |
|---|---|
| No DRX | max(400 ms, ceil($M_{meas\_period\_w/o\_gaps} \times K_p \times K_{layer1\_measurement}$) × SMTC period)[Note 1] × $CSSF_{intra}$ |
| DRX cycle ≤ 320 ms | max(400 ms, ceil(1.5 × $M_{meas\_period\_w/o\_gaps} \times K_p \times K_{layer1\_measurement}$) × max(SMTC period, DRX cycle)) × $CSSF_{intra}$ |
| DRX cycle > 320 ms | ceil($M_{meas\_period\_w/o\_gaps} \times K_p \times K_{layer1\_measurement}$) × DRX cycle × $CSSF_{intra}$ |

NOTE 1:
If different SMTC periodicities are configured for different cells, the SMTC period in the requirement is the one used by the cell being identified The term "SMTC period" indicates the periodicity at which SMTC occasions occur for the UE, while the term "DRX cycle" indicates the length of a discontinuous reception (DRX) cycle of the UE, e.g., in ms. The value $M_{pss/sss\_sync\_w/o\_gaps}$ represents a number of SMTC occasions the UE is expected to need to successfully decode PSS/SSS. The value $M_{meas\_period\_w/o\_gaps}$ represents a number of SMTC occasions the UE is expected to need to successfully measure the SSB. Both $M_{pss\_sss\_sync\_w/o\_gaps}$ and $M_{meas\_period\_w/o\_gaps}$ are currently fixed at 24 (i.e., 3*N, where N=8), for a UE supporting power class 2, 3, or 4, for the reasons discussed above. For purposes of the present discussion, $K_p$, $K_{layer1\_measurement}$, and $CSSF_{intra}$ may be considered to be scaling factors not requiring further description.

However, the preceding values and definitions may not be practicable in some frequency ranges, such as the proposed FR2-2 range. For example, in some scenarios, the applicable frequency range (such as the proposed FR2-2 range) may be included in an unlicensed band. This may require the UE and/or the base station to perform a listen-before-talk (LBT) procedure, requiring a successful clear channel assessment (CCA), before transmitting. In some scenarios, the CCA may fail, due to congestion on the channel from other devices transmitting according to the cellular RAT, or according to some other RAT, such as IEEE 802.11ay. Such CCA failure may cause the base station to not transmit an expected signal, such as an SSB. The UE may therefore fail to successfully detect an SSB from the neighbor cell throughout a complete round of beam sweeping, thus requiring additional SMTC occasions for the UE to complete the cell identification procedure.

To resolve such problems, networks operating in high frequency ranges and/or in unlicensed bands may employ different parameters and/or different UE behaviors in connection with cell identification time requirements, to accommodate cell identification delays that are beyond the control of the UE. For example, the cell identification time (e.g., $T_{identify\_intra\_without\_index\_CCA}$) may continue to be defined as the sum of a PSS/SSS decode time (e.g., $T_{PSS/SSS\_sync\_intra\_CCA}$) and an SSB measurement time (e.g., $T_{SSB\_measurement\_period\_intra\_CCA}$), but the values of such time windows may be modified relative to existing procedures, e.g., as discussed below.

In some implementations, the time allowed for detection and decoding of PSS/SSS may be dynamically adjusted to compensate for SSB RX failures caused by the network. For example, in the context of a 3GPP network operating in the FR2-2 range, the value $M_{PSS/SSS\_sync\_w/o\_gaps}$ may be replaced with a dynamically variable value, denoted herein as $M_{PSS/SSS\_sync\_w/o\_gaps\_CCA}$. The value of $M_{PSSS/SSS\_sync\_w/o\_gaps\_CCA}$ may be defined according to any scheme that compensates for SSB RX failures caused by the network. Two example options for defining $M_{PSS/SSS\_sync\_w/o\_gaps\_CCA}$ are presented as follows.

According to a first option, $M_{pss/sss\_sync\_w/o\_gaps\_CCA} = M_{pss/sss\_sync\_w/o\_gaps} + N*SR_{pss/sss}$. Here, the beam sweeping factor N may be set to 8, as presently defined for FR2-1, or may have a different value. It should be noted that, if N is given a different value, then $M_{pss/sss\_sync\_w/o\_gaps}$ may have a value other than the currently defined value of 24, because $M_{pss/sss\_sync\_w/o\_gaps}$ may be a function of N, as described above.

$SR_{PSS/SSS}$ is an integer value representing a number of rounds of beam sweeping within $T_{PSS/SSS\_sync\_intra\_CCA}$ that included at least one SSB RX failure for which compensation should be made. Thus, the product $N*SR_{PSS/SSS}$ represents the number of additional SMTC occasions to be performed during $T_{PSS/SSS\_sync\_intra\_CCA}$, either because an SSB was not available at the UE during $T_{PSS/SSS\_sync\_intra\_CCA}$ for PSS/SSS detection (e.g., due to LBT failure at the base station), or because the UE could not successfully detect any SSB (e.g., due to beam misalignment). For example, $SR_{PSS/SSS}$ may initially be set to 0, and may be incremented up to one time per beam sweeping round, in response to SSR RX failure during the respective beam sweeping round, due to LBT failure or beam misalignment. Specifically, if, within $T_{PSS/SSS\_sync\_intra\_CCA}$, an SMTC occasion (denoted as occasion X) becomes unavailable due to LBT failure or beam misalignment, $SR_{PSS/SSS}$ may be incremented to 1. $SR_{PSS/SSS}$ may then not be further incremented at least until the next beam sweeping round. Specifically. $SR_{PSS/SSS}$ may be incremented again if at least one SMTC occasion becomes unavailable due to LBT failure or beam misalignment within the set of occasions occurring at X+N through X+2*N−1.

The UE may not have information regarding whether LBT failure or beam misalignment has occurred. Therefore, if the UE is determining $M_{pss/sss\_sync\_w/o\_gaps\_CCA}$, the UE may increment $SR_{PSS/SSS}$ any time the UE fails to receive an SSB within N consecutive SMTC occasions.

In some implementations, a maximum value. $SR_{PSS/SSS,max}$, may also be set, to prevent $M_{pss/sss\_sync\_w/o\_gaps\_CCA}$ (and thus $T_{PSS/SSS\_sync\_intra\_CCA}$) from increasing indefinitely. In some implementations, $SR_{PSS/SSS,max}$ may be set to different values for different DRX cycle lengths. If $SR_{PSS/SSS}$ is increased to a value greater than $SR_{PSS/SSS,max}$, then the UE may switch to another frequency layer for cell detection, e.g., as configured by the network, and may restart the cell identification procedure on the new frequency layer. Alternatively, if $SR_{PSS/SSS}$ is increased to a value greater than $SR_{PSS/SSS,max}$, then the UE and/or the network may remove the timing requirements for PSS/SSS detection. For example, if $SR_{PSS/SSS}$ exceeds $SR_{PSS/SSS,max}$, then the UE may not be required to decode the PSS/SSS within the time specified by the PSS/SSS decode time (e.g., $T_{PSS/SSS\_sync\_intra}$).

In some implementations, $SR_{PSS/SSS}$ may increase only during the first $M_{pss/sss\_sync\_w/o\_gaps}$ SMTC occasions of $T_{PSS/SSS\_sync\_intra\_CCA}$, as an alternative means of providing a maximum value of $SR_{PSS/SSS}$.

According to a second option, $M_{PSS/SSS\_sync\_w/o\_gaps\_CCA} = M_{PSS/SSS\_sync\_w/o\_gaps} + J*L_{PSS/SSS}$. Here, $L_{PSS/SSS}$ is an integer value representing a number of SMTC occasions during which the SSB was not available at the UE during $T_{PSS/SSS\_sync\_intra\_CCA}$ for PSS/SSS detection (e.g., due to LBT failure at the base station). J is an integer value that is no smaller than 1 and no greater than N. In some scenarios. J may be fixed or predetermined.

In some implementations, a maximum value, $L_{PSS/SSS}$ max, may also be set, to prevent $M_{pss/sss\_sync\_w/o\_gaps\_CCA}$ (and thus $T_{PSS/SSS\_sync\_intra\_CCA}$) from increasing indefinitely. In some implementations, $L_{PSS/SSS,max}$ may be set to different values for different DRX cycle lengths. If $L_{PSS/SSS}$ is increased to a value greater than $L_{PSS/SSS,max}$, then the UE may switch to another frequency layer for cell detection, e.g., as configured by the network. Alternatively, if $L_{PSS/SSS}$ is increased to a value greater than $L_{PSS/SSS,max}$, then the UE and/or the network may remove the requirements for PSS/SSS detection. For example, if $L_{PSS/SSS}$ exceeds $L_{PSS/SSS,max}$, then the UE may not be required to decode the PSS/SSS within the time specified by the PSS/SSS decode time (e.g., $T_{PSS/SSS\_sync\_intra\_CCA}$).

In some implementations, $L_{PSS/SSS}$ may increase only during the first $M_{pss/sss\_sync\_w/o\_gaps}$ SMTC occasions of $T_{PSS/SSS\_sync\_intra\_CCA}$, as an alternative means of providing a maximum value of $L_{PSS/SSS}$.

As a variation on the second option, $M_{PSS/SSS\_sync\_w/o\_gaps\_CCA} = M_{PSS/SSS\_sync\_w/o\_gaps} + J*L_{PSS/SSS,max}$. In this variation, $M_{PSS/SSS\_sync\_w/o\_gaps\_CCA}$ may be increased by a larger (e.g., maximum) number of SMTC occasions in response to determining that any SMTC occasions have been dropped. Such a variation may relieve the burden of incrementally increasing the number of SMTC occasions based on the number of SMTC occasions dropped.

In some implementations, the time allowed for measuring the SSB may similarly be dynamically adjusted to compensate for SSB RX failures caused by the network. For example, in the context of a 3GPP network operating in the FR2-2 range, the value $M_{meas\_period\_w/o\_gaps}$ may be replaced with a dynamically variable value, denoted herein as $M_{meas\_period\_w/o\_gaps\_CCA}$. The value of $M_{meas\_period\_w/o\_gaps\_CCA}$ may be defined according to any scheme that compensates for SSB RX failures caused by the network. Two example options for defining $M_{meas\_period\_w/o\_gaps\_CCA}$ are presented as follows.

According to a first option. $M_{meas\_period\_w/o\_gaps\_CCA} = M_{meas\_period\_w/o\_gaps} + N*SR_{meas}$. Here, the beam sweeping factor N may be set to 8, as presently defined for FR2-1, or may have a different value. It should be noted that, if N is given a different value, then $M_{meas\_period\_w/o\_gaps}$ may have a value other than the currently defined value of 24, because $M_{meas\_period\_w/o\_gaps}$ may be a function of N, as discussed above.

$SR_{meas}$ is an integer value representing a number of rounds of beam sweeping within $T_{SSB\_measurement\_period\_intra\_CCA}$ that included at least one SSB RX failure for which compensation should be made. Thus, the product $N*SR_{meas}$ represents the number of additional SMTC occasions to be performed during $T_{SSB\_measurement\_period\_intra\_CCA}$, either because an SSB was not available for measurement at the UE during $T_{SSB\_measurement\_period\_intra\_CCA}$ (e.g., due to LBT failure at the base station), or because the UE could not successfully detect any SSB (e.g., due to beam misalignment). For example, $SR_{meas}$ may initially be set to 0, and may be incremented up to one time per beam sweeping round, in response to SSR RX failure during the respective beam sweeping round, due to LBT failure or beam misalignment. Specifically, if, within $T_{SSB\_measurement\_period\_intra\_CCA}$, an SMTC occasion (denoted as occasion Y) becomes unavailable due to LBT failure or beam misalignment, $SR_{meas}$ may be incremented to 1. $SR_{meas}$ may then not be further incremented at least until the next beam sweeping round. Specifically. $SR_{meas}$ may be incremented again if at least one SMTC occasion becomes unavailable due to LBT failure or beam misalignment within the set of occasions occurring at Y+N through Y+2*N−1.

The UE may not have information regarding whether LBT failure or beam misalignment has occurred. Therefore, if the UE is determining $M_{meas\_period\_w/o\_gaps\_CCA}$, the UE may increment $SR_{meas}$ any time the UE fails to receive an SSB within N consecutive SMTC occasions.

In some implementations, a maximum value. $SR_{meas,max}$, may also be set, to prevent $M_{meas\_period\_w/o\_gaps\_CCA}$ (and thus $T_{SSB\_measurement\_period\_intra\_CCA}$) from increasing indefinitely. In some implementations, $SR_{meas,max}$ may be set to different values for different DRX cycle lengths. If $SR_{meas}$ is increased to a value greater than $SR_{meas,max}$, then the UE may restart the measurement procedure. For example, the UE may restart $T_{SSB\_measurement\_period\_intra\_CCA}$ and disregard previous measurement samples, but may maintain the results of the preceding cell identification procedure (e.g., the cell identification information determined during $T_{PSS/SSS\_sync\_intra\_CCA}$). As another example, the UE may restart the entire cell identification procedure. e.g., by restarting $T_{identify\_intra\_without\_index}$ and disregarding previous cell identification and measurement samples. In some implementations, the UE may restart the cell identification procedure on the same frequency layer. In other implementations, the UE may restart the cell identification procedure on a different frequency layer, e.g., as configured by the network.

In some implementations, $SR_{meas}$ may increase only during the first $M_{meas\_period\_w/o\_gaps}$ SMTC occasions of $T_{SSB\_measurement\_period\_intra\_CCA}$, as an alternative means of providing a maximum value of $SR_{meas}$.

According to a second option, $M_{meas\_period\_w/o\_gaps\_CCA} = M_{meas\_period\_w/o\_gaps} + K*L_{meas}$. Here, $L_{meas}$ is an integer value representing a number of SMTC occasions during which the SSB was not available for measurement at the UE during $T_{SSB\_measurement\_period\_intra\_CCA}$ (e.g., due to LBT failure at the base station). K is an integer value that is no smaller than 1 and no greater than N. In some scenarios. K may be fixed or predetermined.

In some implementations, a maximum value, $L_{meas,max}$, may also be set, to prevent $M_{meas\_period\_w/o\_gaps\_CCA}$ (and thus $T_{SSB\_measurement\_period\_intra\_CCA}$) from increasing indefinitely. In some implementations, $L_{meas,max}$ may be set to different values for different DRX cycle lengths. If $L_{PSS/SSS}$ is increased to a value greater than $L_{meas,max}$, then the UE may restart the measurement procedure. For example, the UE may restart $T_{SSB\_measurement\_period\_intra\_CCA}$ and disregard previous measurement samples, but may maintain the results of the preceding cell identification procedure (e.g., the cell identification information determined during $T_{PSS/SSS\_sync\_intra\_CCA}$). As another example, the UE may restart the entire cell identification procedure, e.g., by restarting $T_{identify\_intra\_without\_index}$ and disregarding previous cell identification and measurement samples. In some implementations, the UE may restart the cell identification procedure on the same frequency layer. In other implementations, the UE may restart the cell identification procedure on a different frequency layer, e.g., as configured by the network.

In some implementations. $L_{meas}$ may increase only during the first $M_{meas\_period\_w/o\_gaps}$ SMTC occasions of $T_{SSB\_measurement\_period\_intra\_CCA}$, as an alternative means of providing a maximum value of $L_{meas}$.

As a variation on the second option, $M_{meas\_period\_w/o\_gaps\_CCA} = M_{meas\_period\_w/o\_gaps} + K*L_{meas\_max}$. In this variation, $M_{meas\_period\_w/o\_gaps\_CCA}$ may be increased by a larger (e.g., maximum) number of SMTC occasions in response to determining that any SMTC occasions have been dropped. Such a variation may relieve the burden of incrementally increasing the number of SMTC occasions based on the number of SMTC occasions dropped.

In some scenarios, a combination of LBT failures and beam sweeping may result in a long time period between successfully received SSBs at the UE. Therefore, in some implementations, a gap threshold may be applied. For example, if, after the UE receives a first SSB, a time exceeding the gap threshold passes without the UE successfully receiving a subsequent SSB, then the first SSB (and any preceding SSBs) may be considered stale, and may be discarded by the UE. The UE may then restart the PSS/SSS detection procedure and or the SSB measurement procedure. In some implementations, this gap threshold may be a fixed value, e.g., identified by an applicable communication standard. In other implementations, the gap threshold may be signaled by the network.

Similar modifications may be applied with regard to inter-frequency measurements. For example, in the context of FR2-1, as presently defined by 3GPP TS 38.133, $T_{identify\_inter\_without\_index} = (T_{PSS/SSS\_sync\_inter} + T_{SSB\_measurement\_period\_inter})$ ms, and $T_{identify\_inter\_with\_index} = (T_{PSS/SSS\_sync\_inter} + T_{SSB\_measurement\_period\_inter} + T_{SSB\_time\_index\_inter})$ ms. These timing values may be modified to depend upon dynamically variable values $M_{PSS/SSS\_sync\_w/o\_gaps\_CCA}$ or $M_{meas\_period\_w/o\_gaps\_CCA}$ in the same manner as described above with regard to the intra-frequency scenarios.

Figure 5:
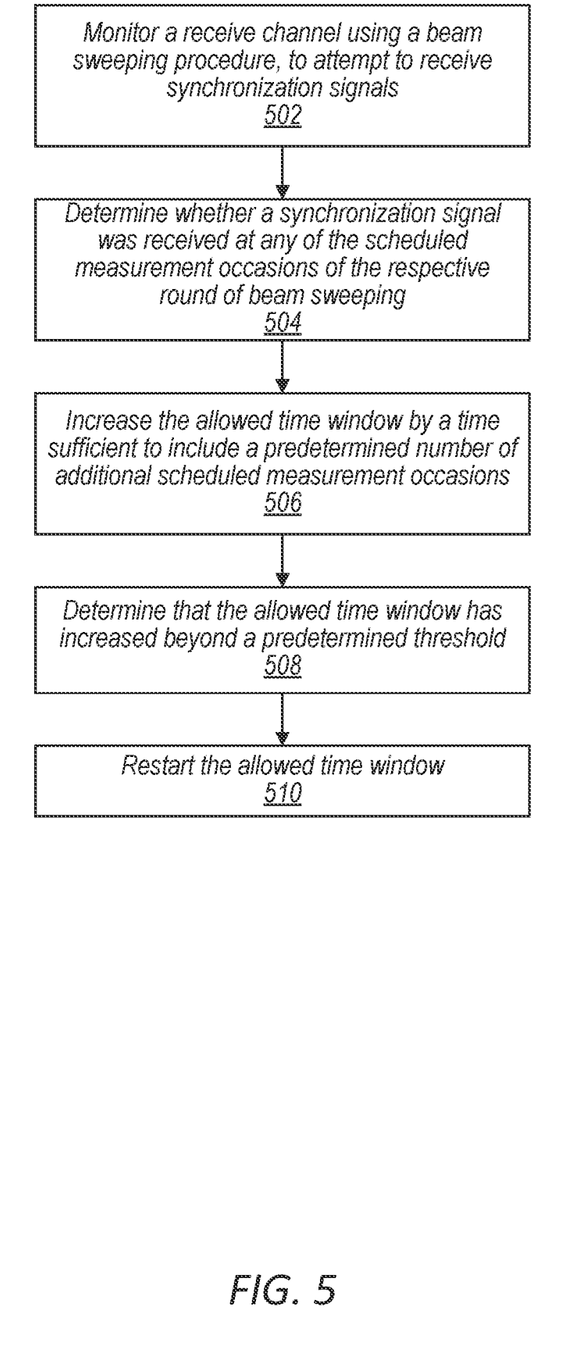
FIG. 5 is a flow chart diagram illustrating a method for performing a cell identification procedure with beam sweeping in a listen-before-talk (LBT) environment, according to some embodiments.

FIG. 5—Example Cell Identification Procedure

FIG. 5 is a flow chart diagram illustrating a method for performing a cell identification procedure with beam sweeping in an LBT environment, according to some embodiments. The method of FIG. 5 may be performed by a UE, such as the UE 106, or by some component thereof, such as by the radio 330 and/or the cellular controller 354. As shown, the method of FIG. 5 may operate as follows.

At 502, the UE 106 may monitor a receive channel on a first frequency layer, using a beam sweeping procedure, to attempt to receive from a neighbor base station up to a predetermined number (S) of synchronization signals, such as SSBs. In some implementations, the receive channel may be included in a frequency band requiring use of an LBT procedure. The UE may expect to receive the synchronization signals at scheduled measurement occasions, such as SMTC occasions, within an allowed time window. For example, an applicable standard may define an allowed time window for the UE to decode cell identification information, such as PSS/SSS; to measure received power, such as an RSRP; or both. The beam sweeping procedure may include performing a plurality of rounds of beam sweeping. A round of beam sweeping may include monitoring the receive channel at N consecutive scheduled measurement occasions, according to N different beam directions. N may represent a beamforming factor, as discussed above.

In some scenarios, an initial value may be defined for the allowed time window. The initial value of the allowed time window may include N*S scheduled measurement occasions. For example, in some scenarios, S may represent a number of synchronization signals (e.g., 3) that must be successfully decoded to determine cell identification information included in the synchronization signals. As another example, S may represent a number of synchronization signals (e.g., 3) that must be measured to determine an average receive power of the synchronization signals. As yet another example, S may represent a number of synchronizations signals (e.g., 6) that must be received to perform both cell identification and power measurement. Thus, in some implementations, the initial value may be equivalent to a cell identification time (such as $T_{identify\_intra\_without\_index}$ or $T_{identify\_inter\_without\_index}$), a decoding time (such as $T_{PSS/SSS\_sync\_intra}$ or $T_{PSS/SSS\_sync\_inter}$), or a power measurement time (such as $T_{SSB\_measurement\_period\_intra}$ of $T_{SSB\_measurement\_period\_inter}$).

At 504, the UE 106 may, for each round of beam sweeping performed within the allowed time window, determine whether a synchronization signal was received at any of the scheduled measurement occasions of the respective round of beam sweeping. For example, in some scenarios, a synchronization signal may not be received due to LBT failure or beam misalignment during one or more of the scheduled measurement occasions.

At 506, in response to determining that no synchronization signal was received at any of the scheduled measurement occasions of the respective round of beam sweeping, the UE 106 may increase the allowed time window by a time sufficient to include a predetermined number of additional scheduled measurement occasions. For example, the UE 106 may increase the allowed time window by a time sufficient to include N additional scheduled measurement occasions. As another example, the UE 106 may increase the allowed time window by a time sufficient to include one additional scheduled measurement occasion. In some scenarios, increasing the allowed time window by a time sufficient to include a predetermined number of additional scheduled measurement occasions may include increasing a value of M (e.g., $M_{pss/sss\_sync\_w/o\_gaps\_CCA}$ or $M_{meas\_period\_w/o\_gaps\_CCA}$), by a predetermined number of SMTC occasions, as discussed above.

At 508, the UE may determine that the allowed time window has increased beyond a predetermined threshold. In some scenarios, the predetermined threshold may be determined based on a discontinuous reception (DRX) cycle length used by the UE.

In response, the UE may, at 510, restart the allowed time window. The UE may therefore start over in monitoring the receive channel to attempt to receive the S synchronization signals. In some scenarios, the UE may also transition to monitoring a different frequency layer.

In other scenarios, the UE may not determine that the allowed time window has increased beyond a predetermined threshold, in which case 508 and 510 may be omitted. For example, the UE may instead determine that S synchronization signals have been successfully received. The UE may decode and/or measure the power of the received synchronization signals. In some such scenarios, the UE may respond by transmitting to a serving base station a synchronization signal measurement report within the predetermined time window. For example, the synchronization signal measurement report may include a cell identification of the neighbor cell and an RSRP of the received synchronization signals.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method comprising:
  by a user equipment (UE):
    monitoring a receive channel on a first frequency layer, using a beam sweeping procedure, to attempt to receive from a neighbor base station up to a predetermined number(S) of synchronization signals at scheduled measurement occasions within an allowed time window, wherein the beam sweeping procedure includes performing a plurality of rounds of beam sweeping, wherein a round of beam sweeping includes monitoring the receive channel at N consecutive scheduled measurement occasions, according to N different beam directions, wherein an initial value of the allowed time window includes N*S scheduled measurement occasions;
    for each round of beam sweeping performed within the allowed time window:
      determining whether a synchronization signal was received at any of the scheduled measurement occasions of the respective round of beam sweeping; and
      in response to determining that no synchronization signal was received at any of the scheduled measurement occasions of the respective round of beam sweeping, increasing the allowed time window by a time sufficient to include a predetermined number of additional scheduled measurement occasions;

determining that the allowed time window has increased beyond a predetermined threshold; and in response to determining that the allowed time window has increased beyond the predetermined threshold, restarting the allowed time window.

2. The method of claim 1, further comprising:
transmitting to a serving base station a synchronization signal measurement report within the predetermined time window upon successfully receiving S synchronization signals.

3. The method of claim 2, wherein the synchronization signal measurement report includes a cell identification of the neighbor cell and at least one of: a reference signal receive power (RSRP), a reference signal received quality (RSRQ), or a signal-to-noise and interference ratio (SINR) of the received synchronization signals.

4. The method of claim 3, further comprising:
decoding a first subset of the S synchronization signals to obtain the cell identification of the neighbor cell; and
measuring a second subset of the S synchronization signals to obtain the at least one of the RSRP, RSRQ, or SINR.

5. The method of claim 1, further comprising:
in response to determining that the allowed time window has increased beyond the predetermined threshold, transitioning to monitoring a second, different frequency layer.

6. The method of claim 1, wherein the predetermined threshold is determined based on a discontinuous reception (DRX) cycle length used by the UE.

7. The method of claim 1, wherein the receive channel is included in a frequency band requiring use of a listen-before-talk (LBT) procedure.

8. The method of claim 1, wherein the predetermined number of additional scheduled measurement occasions is N additional scheduled measurement occasions.

9. An apparatus for performing communication functions in a user equipment (UE) device, the apparatus comprising:
memory, storing software instructions; and
at least one processor configured to execute the software instructions to cause the UE to:
monitor a receive channel on a first frequency layer, using a beam sweeping procedure, to attempt to receive from a neighbor base station up to a predetermined number(S) of synchronization signals at scheduled measurement occasions within an allowed time window, wherein the beam sweeping procedure includes performing a plurality of rounds of beam sweeping, wherein a round of beam sweeping includes monitoring the receive channel at N consecutive scheduled measurement occasions, according to N different beam directions, wherein an initial value of the allowed time window includes N*S scheduled measurement occasions;
for each round of beam sweeping performed within the allowed time window:
determine whether a synchronization signal was received at any of the scheduled measurement occasions of the respective round of beam sweeping; and
in response to determining that no synchronization signal was received at any of the scheduled measurement occasions of the respective round of beam sweeping, increase the allowed time window by a time sufficient to include a predetermined number of additional scheduled measurement occasions;

determine that the allowed time window has increased beyond a predetermined threshold; and
in response to determining that the allowed time window has increased beyond the predetermined threshold, restart the allowed time window.

10. The apparatus of claim 9, wherein the software instructions further cause the UE to:
transmit to a serving base station a synchronization signal measurement report within the predetermined time window upon successfully receiving S synchronization signals.

11. The apparatus of claim 10, wherein the synchronization signal measurement report includes a cell identification of the neighbor cell and at least one of: a reference signal receive power (RSRP), a reference signal received quality (RSRQ), or a signal-to-noise and interference ratio (SINR) of the received synchronization signals.

12. The apparatus of claim 11, wherein the software instructions further cause the UE to:
decode a first subset of the S synchronization signals to obtain the cell identification of the neighbor cell; and
measure a received power of a second subset of the S synchronization signals to obtain the at least one of the RSRP, RSRQ, or SINR.

13. The apparatus of claim 9, wherein the software instructions further cause the UE to:
in response to determining that the allowed time window has increased beyond the predetermined threshold, transition to monitoring a second, different frequency layer.

14. The apparatus of claim 9, wherein the predetermined threshold is determined based on a discontinuous reception (DRX) cycle length used by the UE.

15. A non-transitory computer-readable memory medium storing software instructions that, when executed by a processor of a user equipment (UE), cause the UE to:
monitor a receive channel on a first frequency layer, using a beam sweeping procedure, to attempt to receive from a neighbor base station up to a predetermined number (S) of synchronization signals at scheduled measurement occasions within an allowed time window, wherein the beam sweeping procedure includes performing a plurality of rounds of beam sweeping, wherein a round of beam sweeping includes monitoring the receive channel at N consecutive scheduled measurement occasions, according to N different beam directions, wherein an initial value of the allowed time window includes N*S scheduled measurement occasions; and
for each round of beam sweeping performed within the allowed time window:
determine whether a synchronization signal was received at any of the scheduled measurement occasions of the respective round of beam sweeping; and
in response to determining that no synchronization signal was received at any of the scheduled measurement occasions of the respective round of beam sweeping, increase the allowed time window by a time sufficient to include a predetermined number of additional scheduled measurement occasions;
determine that the allowed time window has increased beyond a predetermined threshold; and
in response to determining that the allowed time window has increased beyond the predetermined threshold, restart the allowed time window.

16. The non-transitory computer-readable memory medium of claim 15, wherein the software instructions further cause the UE to:
- in response to determining that the allowed time window has increased beyond the predetermined threshold, transition to monitoring a second, different frequency layer.

17. The non-transitory computer-readable memory medium of claim 15, wherein the predetermined threshold is determined based on a discontinuous reception (DRX) cycle length used by the UE.

* * * * *